(12) United States Patent
Klein et al.

(10) Patent No.: US 7,133,941 B2
(45) Date of Patent: Nov. 7, 2006

(54) METHOD AND MECHANISM OF ACCESSING SEGMENTS IN DATA STORAGE SYSTEMS

(75) Inventors: Jonathan D. Klein, Redwood City, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 395 days.

(21) Appl. No.: 10/727,775

(22) Filed: Dec. 3, 2003

(65) Prior Publication Data

US 2005/0125573 A1 Jun. 9, 2005

(51) Int. Cl.
*G06F 13/00* (2006.01)
*G06F 13/00* (2006.01)

(52) U.S. Cl. .......................... 710/36; 710/72; 711/112; 711/161; 711/170; 707/1; 707/205

(58) Field of Classification Search .................. 710/1, 710/36–45, 72–74; 711/100–114, 161–164, 711/170–174; 707/1, 200–206
See application file for complete search history.

(56) References Cited

U.S. PATENT DOCUMENTS

| | | | | |
|---|---|---|---|---|
| 5,873,101 A * | 2/1999 | Klein | ......................... | 707/204 |
| 6,487,561 B1 * | 11/2002 | Ofek et al. | .................. | 707/204 |
| 6,574,717 B1 * | 6/2003 | Ngai et al. | ................... | 711/147 |
| 6,804,627 B1 * | 10/2004 | Marokhovsky et al. | ..... | 702/182 |
| 6,871,263 B1 * | 3/2005 | Dandrea | ...................... | 711/114 |
| 6,907,499 B1 | 6/2005 | Herbst et al. | | |
| 6,973,549 B1 * | 12/2005 | Testardi | ...................... | 711/150 |

OTHER PUBLICATIONS

Acharya, A. et al., "Tuning the Performance of I/O-Intensive Parallel Applications", *Proceedings of the 4th Workshop on I/O in Parallel and Distributed Systems*, ACM Press, 1996, pp. 15-27, USA.

Bagrodia, R. et al., Paralllel Simulation of Parallel File Systems and I/O Programs, *Proceedings of the 1997 ACM/IEEE Conference on Supercomputing (CDROM)*, Acm Press, 1997, pp. 1-16.

Bordawekar, R. et al., "A Model and Compilation Strategy for Out-of-Core Data Parallel Programs", ACM SIGPLAN Notices, *Proceedings of the 5th ACM SIGPLAN Symposium on Principles and Practice of Parallel Programming PPOPP*, 1995, vol. 30, Issue 8, pp. 1-10.

Bordawekar, R. et al., Automatic Optimization of Communication in Compiling Out-of-core Stencil Codes, *Proceedings of the 10th International Conference on Supercomputing*; ACM Press, 1996, pp. 366-373, USA.

Bordawekar, R. et al., "Communication Strategies for Out-of-Core Programs on Distributed Memory Machines", *Proceedings of the 9th International Conference on Supercomputing*, ACM Press, 1995, pp. 395-403, Spain.

(Continued)

*Primary Examiner*—Christopher Shin
(74) *Attorney, Agent, or Firm*—Bingham McCutchen LLP

(57) ABSTRACT

A method and mechanism of accessing segments in data storage systems is disclosed. In one embodiment, extents in a segment are coalesced into groups based on the data storage device each extent is stored on. Rather than submit an I/O operation for each extent, a single I/O operation is submitted for each group of extents.

36 Claims, 6 Drawing Sheets

OTHER PUBLICATIONS

Bordawekar, R. et al., "Design and Evaluation of Primitives for Parallel I/O", *Proceedings of the 1993 ACM/IEEE Conference on Supercomputing*, ACM Press, 1993, pp. 452-461.

Bordawekar, R., "Implementation of Collective I/O in the Intel Paragon Parallel File System: Initial Experiences", *Proceedings of the 11th International Conference on Supercomputing*, ACM Press, 1997, pp. 20-27, Austria.

Chen, Y. et al., "Optimizing Collective I/O Performance on Parallel Computers: A Multisystem Study", *Proceedings of the 11th International Conference on Supercomputing, ACM Press and IEEE Computer Society*, 1997, pp. 28-35, Austria.

Chen, Y., et al., "Automatic Parallel I/O Performance Optimization in Panda", *Proceedings of the 10th Annual ACM Symposium on Parallel Algorithms and Architectures*, ACM, 1998, pp. 108-118, Mexico.

Corbett, P., et al., "The Vesta Parallel File System", *ACM Transactions on Computer Systems*, ACM Press, vol. 14, No. 3, pp. 225-264.

Cortes, T., et al., "Design Issues of a Cooperative Cache with No Coherence Problems", *Proceedings of the 5th Workshop on I/O in Parallel and Distributed Systems, ACM Press*, 1997, pp. 37-46.

Del Rosario, J. et al., "Improved Parallel I/O via a Two-phase Run-Time Access Strategy", *ACM SIGARCH Computer Architecture News*, 1993, vol. 21, No. 5, pp. 31-38.

Dickens, P., "An Evaluation of Java's I/O Capabilities for High-Performance Computing", *Proceedings of the ACM 2000 Conference on Java Grande*, ACM, 2000, pp. 26-35, USA.

Ferreira, R. et al., "Compiling Object-Oriented Data Intensive Applications", *Proceedings of the 14th International Conference on Supercomputing*, ACM Press, 2000, pp. 11-21, USA.

Gibson et al., "Strategic Directions in Storage I/O Issue in Large-Scale Computing", *ACM Computing Surveys (CSUR)*, ACM Press, 1996, vol. 28 No. 4, pp. 779-793.

Gross, T. et al., "Architecture Implications of High-Speed I/O for Distributed-Memory Computers", *Proceedings of the 8th International Conference on Supercomputing*, ACM Press, 1994, pp. 176-185, U.K.

Harry, M. et al., "The Design of VIP-FS: A Virtual, Paralllel File System for High Performance Paralllel and Distributed Computing", *ACM SIGOPS Operating Systems Review*, ACM Press, 1995, vol. 29 No. 3, pp. 35-48.

Kotz, D. et al., "Dynamic File-Access Characteristics of a Production Parallel Scientific Workload", *Proceedings of the 1994 ACM/IEEE Conference on Supercomputing*, ACM Press, 1994, pp. 640-649.

Kotz, D. et al., "Flexibility and Performance of Parallel File Systems", *SIGOPS Operating Systems Review*, ACM Press, 1994, vol. 30 Issue 2, pp. 63-73.

Kotz, D., "Disk-Directed I/O for MIMD Multiprocessors", *ACM Transactions on Computer Systems(TOCS)*, ACM Press, vol. 15, No. 1, Feb. 1997, pp. 41-74, USA.

Krieger, O. et al., "A Performance-Oriented Flexible File System based on Building-Block Compositions", *Proceedings of the 4th Workshop on I/O in Parallel and Distributed Systems*, ACM Press, 1996, pp. 95-108, USA.

Krieger, O. et al., "HFS: A Performance-Oriented Flexible File System Based on Building-Block Compositions", *ACM Transactions on Computer Systems* (TOCS), ACM Press, vol. 15 No. 3, ACM, 1997, pp. 286-321.

Kurc, T. et al., "Querying Very Large Multi-Dimensional Datasets in ADR", *Proceedings of the 1999 ACM/IEEE Conference on Supercomputing*, ACM Press, 1999, pp. 1-15, USA.

Lee, J. et al., "Active Buffering Plus Compressed Migration: An Integrated Solution to Parallel Simulations' Data Transport Needs", *Proceedings of the 16th International Conference on Supercomputing*, ACM Press, 2002, pp. 156-166, New York, New York, USA.

Mache, J. et al., "The Impact of Spatial Layout of Jobs of Parallel I/O Performance", *Proceedings of the 6th Workshop on I/O in Parallel and Distributed Systems*, ACM Press, 1999, pp. 45-56, USA.

Madhyastha, T. et al., Informed Prefetching of Collective Input/Output Requests, *Proceedings of the 1999 ACM/IEEE Conference on Supercomputing*, ACM Press, 1999, pp. 1-16, USA.

Moore, J.A. et al., "Efficient Data-Parallel Files via Automatic Mode Detection", *Proceedings of the 4th Workshop on I/O in Parallel and Distributed Systems*, ACM Press, 1996, pp. 1-14, USA.

Nieuwejaar, N. et al., "Performance of the Galley Parallel File System", *Proceedings of the 4th Workshop on I/O in Parallel and Distributed Systems: Part of the Federated Computing Research Conference*, ACM Press, 1996, pp. 83-94, USA.

No, J. et al., "Integratin Parallel File I/O and Database Support for High-Performance Scientific Data Management", *Proceedings of the 2000 ACM/IEEE Conference on Supercomputing (CDROM)*, IEEE Computer Society, pp. 1-13, USA.

Park, Y. et al., "Virtual Memory Versus File Interfaces for Large, Memory-Intensive Scientific Applications", *Proceedings of the 1996 ACM/IEEE Conference on Supercomputing (CDROM)vol. 00 Supercomputing '96*, ACM Press, IEEE Computer Society, 1996, pp. 1-20.

Purakayastha, A. et al., "Enwrich: A Compute-Processor Write Caching Scheme for Parallel File Systems", *Proceedings of the 4th Workshop on I/O in Parallel and Distributed Systems*, ACM Press, 1996, pp. 55-68.

Shen, S. et al., "A Novel Application Development Environment for Large-Scale Scientific Computations", *Proceedings of the 14th International Conference on Supercomputing*, ACM Press, 2000, pp. 274-283, USA.

Shuf, Y. et al., "Characterizing the Memory Behavior of JAVA Workloads: A Structured View and Opportunities for Optimization"; *Proceedings of the 2001 ACM Sigmetrics International Conference on Measurement and Modeling of Computer Systems Sigmetrics '01*, ACM Press, 2001, vol. 29 No. 1, pp. 194-205.

Steenkiste, P. et al., "Architecture and Evaluation of a High-Speed Networking Subsystem for Distribution-Memory Systems"; ACM SIGARCH Computer Architecture News, *Proceedings of the 21st Annual International Symposium on Computer Architecture ISCA '94*, IEEE Computer Society Press, ACM Press, 1994, vol. 22 No. 2, pp. 154-163.

Sturtevant, J. et al., "PDS/PIO: Lightweight Libraries for Collective Parallel I/O", *Proceedings of the 1998 ACM/IEEE Conference on Supercomputing (CDROM)*, IEEE Computer Society, 1998, pp. 1-13.

Thakur, R. et al., "A Case for Using MPI's Derived Datatypes to Improve I/O Performance", *Proceedings of the 1998 ACM/IEEE Conference on Supercomputing(CDROM)*, IEEE Computer Society, 1998, pp. 1-14.

Thakur, R. et al., "Compilation of Out-of-Core Data Parallel Programs for Distributed Memory Machines", *ACM SIGARCH Computer Architecture News*, ACM Press, vol. 22 Issue 4, 1994, pp. 23-28.

Thakur, R. et al., "On Implementing MPI-IO Portably and with High Performance", *Proceedings of the 6th Workshop of I/O in Parallel and Distributed Systems*, ACM Press, 1999, pp. 23-32, USA.

Thakur, R., et al., "Compiler and Runtime Support for Out-of-Core HPF Programs", *Proceedings of the 8th International Conference on Supercomputing*, 1994, ACM Press, pp. 382-391.

Vitter, J., External Memory Algorithms and Data Structures: Dealing with Massive Data; *ACM Computing Surveys (CSUR)*, vol. 23 No. 2, pp. 209-271, 2001.

Wang, Y. et al., "Profile-Guided I/O Partitioning", *Proceedings of the 17th Annual International Conference on Supercomputing*, ACM 2003, pp. 252-260, USA.

Wu, J. et al., "Placement of I/O Servers to Improve Paralle I/O Performances on Switch-Based Clusters", *Proceedings of the 17th Annual International Conference on Supercomputing*, ACM Press, 2003, pp. 244-251, USA.

Zhou, Y. et al., "Thread Scheduling for Out-of-Core Applications With Memory Server on Multicomputers",*Proceedings of the 6th Workshop on I/O in Parallel and Distributed Systems*, ACM Press, 1999, pp. 57-67, USA.

\* cited by examiner

METHOD AND MECHANISM OF ACCESSING SEGMENTS IN DATA STORAGE SYSTEMS

BACKGROUND AND SUMMARY

The present invention is related to data storage systems. More particularly, the present invention is directed to a method and mechanism of accessing segments in data storage systems.

Conventional data storage systems include one or more storage devices connected to a controller or manager. As used herein, the term "data storage device" refers to any device or apparatus utilizable for the storage of data, e.g., a disk drive. For explanatory purposes only and not as an intent to limit the scope of the invention, the term "disk drive" as used in this document is synonymous with the term "data storage device."

Data storage devices typically store data on one or more magnetic discs called platters. To access stored data, the platter on which the data is stored has to be moved into the correct position before the data can be read, i.e., the sector of the platter where the data is located on has to be positioned under a special electromagnetic read/write device called a head, which is mounted onto a slider on an arm that is positioned over the surface of the platter by an actuator. Once the platter is in the correct position, the platter rotates at high speed, driven by a spindle motor connected to the spindle that the platter is mounted on, and the head reads the data on the platter as it flies by.

The time it takes to move the platter into the correct position, i.e., the seek time, is frequently the most expensive part of an I/O (input/output) operation. The seek time can vary anywhere from 5–15 ms (milliseconds). Whereas the time it takes to read the data from the platter once it is in the correct position could be as fast as a couple of milliseconds depending upon the transfer rate of the disk drive, which is a function of the RPM (rotations per minute) of the disk drive, and the amount of data to be read.

Data in data storage systems are usually organized into rows, blocks, extents, segments, and tables. Data are stored in rows. Rows, in turn, are stored in blocks. Each block, also referred to as a page, corresponds to a specific number of bytes of physical space on a data storage device. The size of a block is usually set at a prescribed level when the data storage system is created and will typically be a multiple of the operating system's block size.

Blocks, in turn, are stored in extents. An extent is a contiguous set of blocks on a disk drive. Extents are stored in segments, which are logical containers each holding a set of extents. For various reasons, e.g., load balancing, random access, etc., extents of a segment may not be contiguous on a data storage device, may span multiple files on a data storage device, and may even span multiple data storage devices. Each table comprises one or more segments.

There are two types of data access in data storage systems: random and sequential. An example of random access is access using RowIDs. A RowID is a physical identifier of a row. RowIDs may be stored separately from the table, e.g., in an index. A full table scan is an example of sequential access. In a full table scan, the one or more segments in the table have to be identified and all of the extents in each segment have to be located. I/O operations are then submitted to access each segment. The I/O operations are usually submitted on an extent by extent basis since extents are contiguous blocks on a data storage device and extents in each segment may be striped across multiple data storage devices.

Given that the I/O operations are submitted on an extent by extent basis, performance of full table scans can vary greatly depending upon the number of extents in the segment(s) of each table. Fewer extents mean less I/O operations, which result in less time spent seeking data and more time spent reading data. In order to optimize space utilization, however, extent sizes in data storage systems are usually minimized. Smaller extent sizes generally lead to an increase in the number of extents per segment as more extents will be needed to store the same amount of data.

Accordingly, it is desirable to provide a method and mechanism where the performance of a full table scan is unaffected by the size of the extents in the segment(s) of the table.

The present invention provides a method and mechanism of accessing segments in data storage systems. In one embodiment, a plurality of extents in a segment are coalesced into a plurality of groups based on data storage device location. A single I/O operation is then submitted for each group of extents.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Access of segments in data storage systems is disclosed. Rather than submit an I/O operation for each extent in a segment, which can dramatically affect performance of sequential access in data storage systems, some or all of the extents in the segment are grouped together based on data storage device location and a single I/O operation is submitted for each group of extents. This reduces the effects that smaller extent sizes have on the performance of full table scans.

Figure 1:
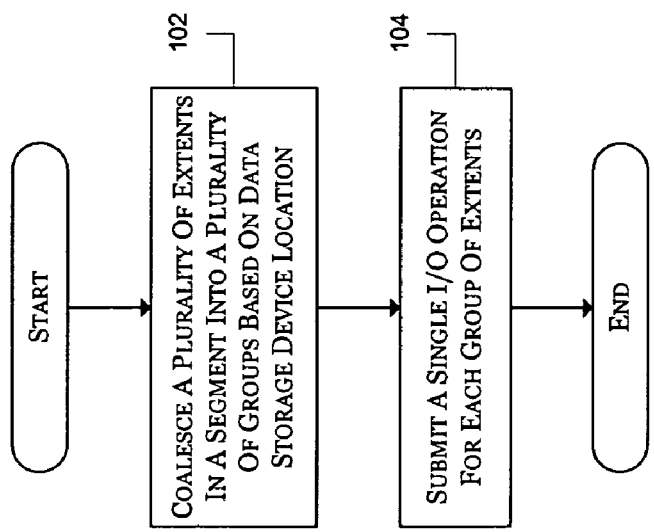
FIG. 1 is a flow chart of a method of accessing segments in data storage systems according to one embodiment of the invention.

Illustrated in FIG. 1 is a method of accessing segments in data storage systems according to one embodiment of the invention. At 102, a plurality of extents in a segment is coalesced into a plurality of groups based on data storage device location. A single I/O operation is then submitted for each group of extents at 104.

Figure 2:
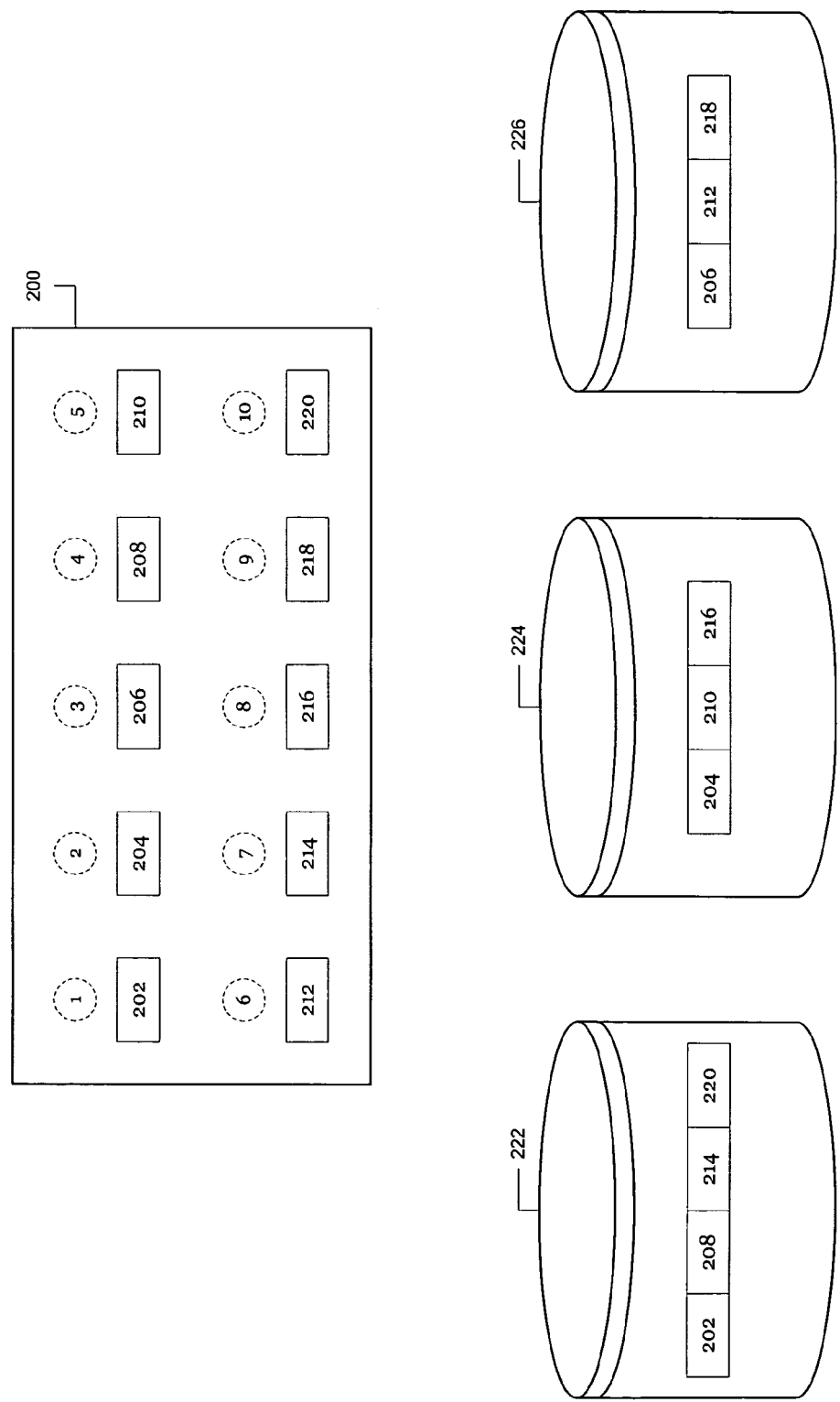
FIGS. 2–3 illustrate examples of segments according to various embodiments of the invention.

FIG. 2 depicts a segment 200 comprising extents 202–220. Extents 202–220 are logically numbered from 1 to 10. The extents in segment 200 are striped over three data storage devices 222–226. As seen from the example in FIG. 2, although extents 202, 208, 214, and 220 are not logically contiguous, they are physically contiguous on data storage device 222. In one embodiment, all of the extents in segment 200 are coalesced into three groups based on data storage device location, i.e., extents 202, 208, 214, and 220 form one group, extents 204, 210, and 216 form the another group, and extents 206, 212, and 218 form the last group. To access segment 200, one I/O operation is submitted for each group of the extents. Hence, instead of submitting ten I/O operations, which can greatly affect the performance of a full scan of a table comprising segment 200, only three I/O operations need to be submitted.

Figure 3:
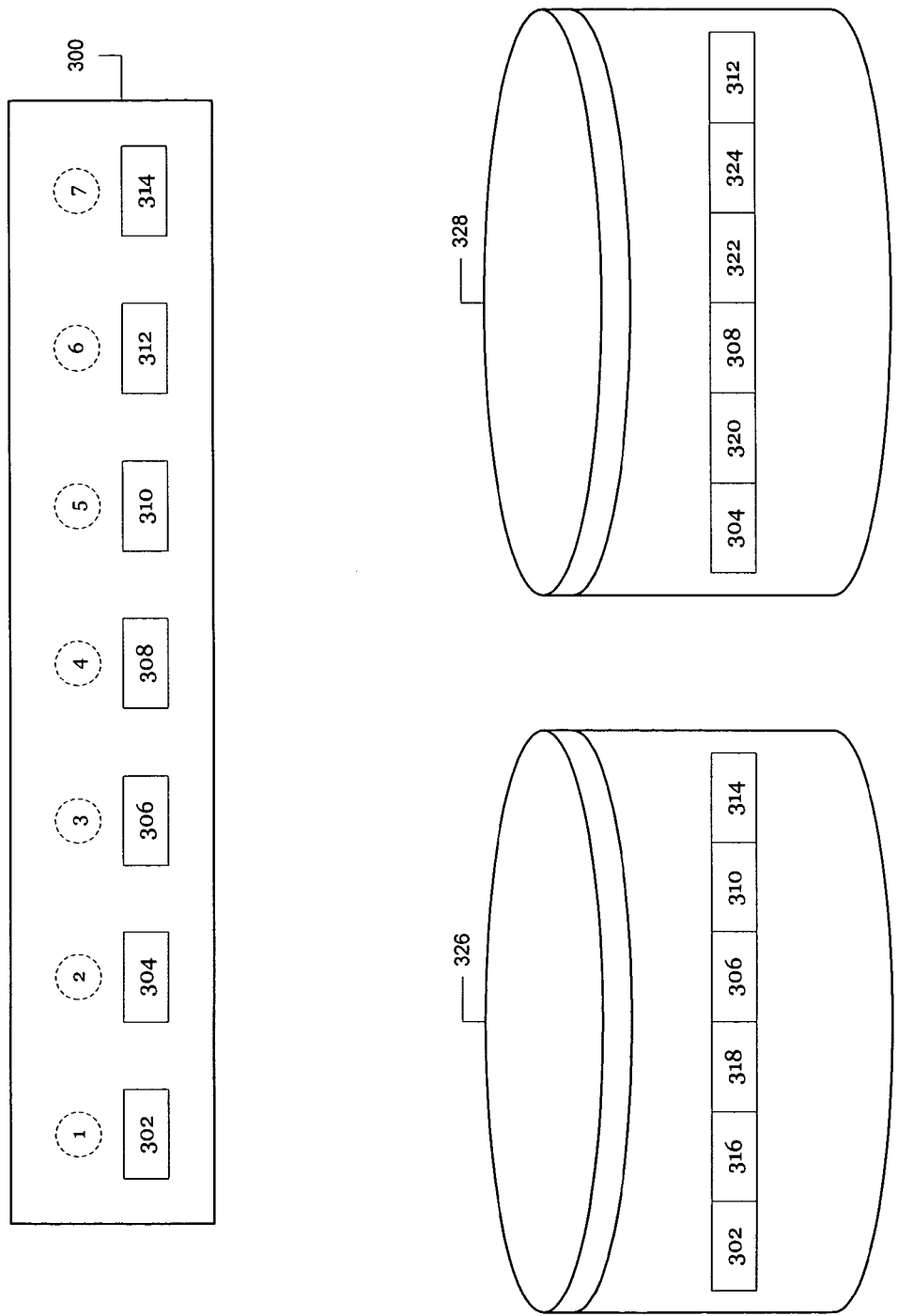

An I/O operation may return one or more extents that are not in the segment being accessed. As shown in FIG. 3, a segment 300 comprises extents 302–314, which are logically numbered 1 to 7. Extents 302-314 are striped over two data storage devices 326–328. Although extents 302, 306, 310, and 314 are all stored on disk 326, extent 302 is not contiguous with extents 306, 310, and 314. Two other extents 316–318, which are not part of segment 300, are sandwiched between extents 302 and 306. Thus, if one I/O is submitted for extents 302, 306, 310, and 314, the I/O will also return extents 316–318. Since memory is inexpensive, it may still be more efficient to submit one I/O for extents 302, 306, 310, and 314 instead of four I/Os, one for each extent.

Figure 4:
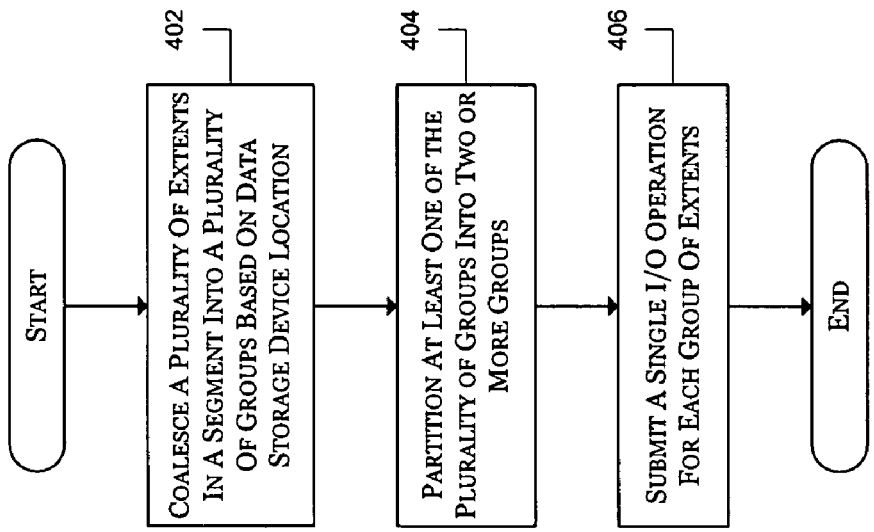
FIG. 4 depicts a process flow of a method of accessing segments in data storage systems according to another embodiment of the invention.

FIG. 4 illustrates a method of accessing segments in data storage systems according to another embodiment of the invention. A plurality of extents in a segment is coalesced into a plurality of groups based on data storage device location (402). At least one of the plurality of groups is partitioned into two or more groups (404). A single I/O operation is then submitted for each group of extents (406).

Figure 5:
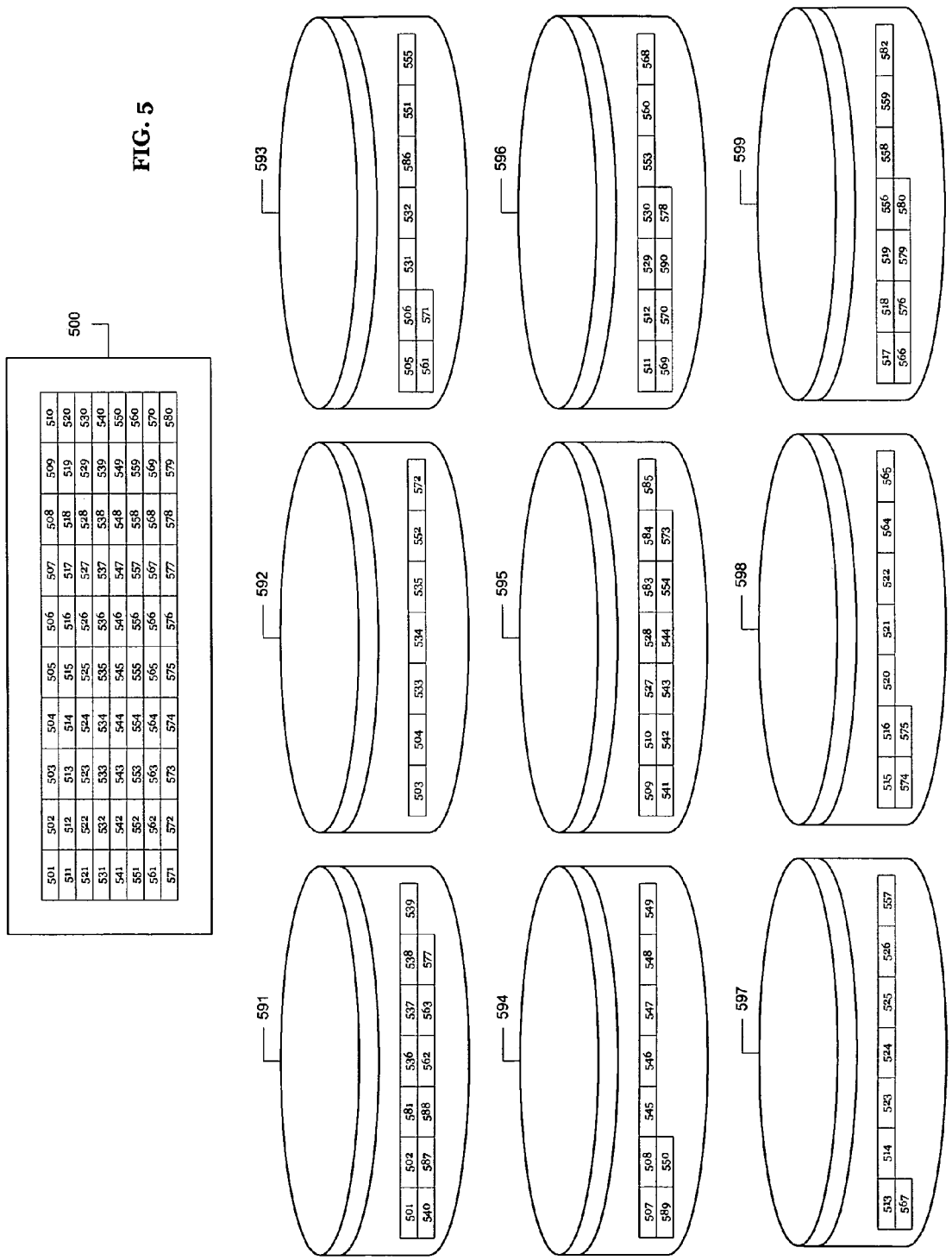
FIG. 5 shows a sample segment according to an embodiment of the invention.

A sample segment 500 is depicted in FIG. 5. Segment 500 comprises eighty extents 501–580 spread out over nine disk drives 591–599. The number of extents coalesced may be less than all of the extents in the segment. For example, if a user decided that no more than 20 extents should be coalesced at any one time, extents 501–520 would be coalesced into nine groups and an I/O operation would be submitted for each group. Extents 521–540 would be then be coalesced into seven groups and an I/O operation would be submitted for each group, and so forth.

Users may terminate access to a segment before all of the extents in the segment have been returned or even coalesced. For instance, after viewing an initial set of data, a user may decide that no other data is necessary and choose to terminate access to the segment before all of the data have been returned.

One or more coalesced groups may be further divided into additional groups based on various factors, e.g., size, performance, etc. For example, if one I/O operation is submitted for the group of extents on disk drive 591, the I/O operation would return three extents 581 and 587–588 that are not within segment 500. To improve performance, the group may be divided into three groups, one group containing extents 501–502, another group containing extents 536–540, and the last group containing extents 562–563 and 577. Three I/O operations can then be submitted, one for each group of extents, which will exclude the three non-segment 500 extents 581 and 587–588 sandwiched between the three groups.

In the examples of FIGS. 2–3 and 5, only the extents in segments 200, 300, and 500 and any extents sandwiched between the extents of those segments are shown as being stored in data storage devices 222–226, 326–328, and 591–599. Data storage devices 222–226, 326–328, and 591–599, however, may contain other extents that are not shown. Additionally, although the extents in FIGS. 2–3 and 5 are illustrated to be of the same size, extents may vary in size within and across segments.

Figure 6:
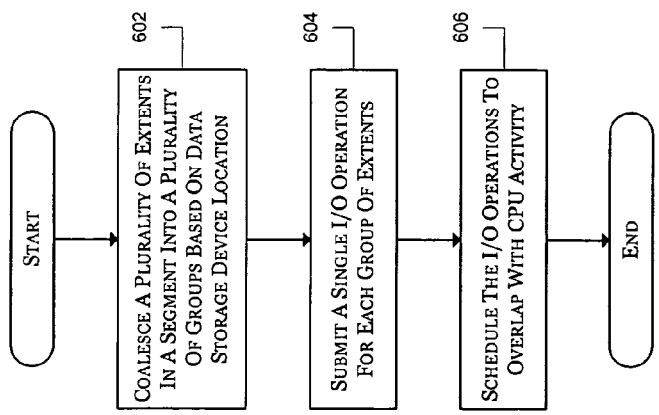

Another method of accessing segments in data storage systems is shown in FIG. 6. At 602, a plurality of extents in a segment are coalesced into a plurality of groups based on data storage device location. A single I/O operation is submitted for each group of extents (604). The I/O operations are scheduled to overlap with CPU (central processing unit) activity (606). In one embodiment, the I/O operations are scheduled to ensure that the CPU is not idle while an I/O operation is executing.

By overlapping I/O operations with CPU activity, the rate in which results are returned to users, i.e., throughput, can be greatly improved. For example, after an I/O operation for a group of extents have completed, the CPU will process the returned extents, e.g., evaluate rows in the extents against a predicate. Rather than waiting until the CPU has finished processing the first group of extents before submitting another I/O operation, an I/O operation can be submitted for another group of extents while the CPU is processing the first group of extents. If the I/O operations are scheduled correctly, when the CPU finishes processing the first group of extents, the CPU can begin processing the other group of extents as the I/O operation for the other group should have completed by then. This way, the CPU does not remain idle after it finishes processing the first group of extents and before the I/O operation for the other group has ended.

The scheduling of I/O operations to overlap with CPU activity can also influence whether to partition any of the coalesced group of extents. For instance, if one group of extents is much larger than another group of extents, then the time it takes for the I/O operation of the larger group of extents to complete will likely be much longer than the time it takes to process the extents in the smaller group. Thus, even though the I/O operation is scheduled to overlap with CPU activity, the CPU will remain idle while it waits for the I/O operation of the larger group to finish. To better utilize resources and improve throughput, the larger group of extents can be divided into smaller groups in order to reduce the I/O operation time. Although this will increase the number of I/O operations, it may still be a more efficient use of resources and lead to improved throughput.

Figure 7:
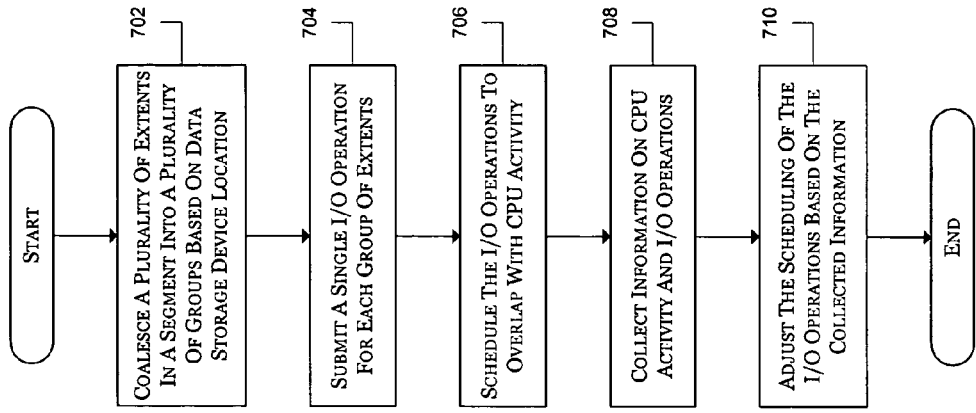
FIGS. 6–7 are different embodiments of methods of accessing segments in data storage systems.

Depicted in FIG. 7 is a method of accessing segments in data storage systems according to an embodiment of the invention. A plurality of extents in a segment are coalesced into a plurality of groups based on data storage device location (702). A single I/O operation is submitted for each group of extents (704). The I/O operations are scheduled to overlap with CPU activity (706). Information on CPU activity and I/O operations are collected (708) and the scheduling of the I/O operations is adjusted based on the collected information (710).

The information collected may include information on whether the CPU has been idle during the last I/O operation. For example, the scheduling of I/O operations may be based upon system estimates on the amount of time it will take to process the extents returned from each of the I/O operations.

Estimation of CPU activity may be incorrect due to erroneous approximation of the number of rows in each block of an extent. For instance, if the system expected thousands of rows in an extent, but it ended up processing only a few hundred rows, the CPU activity will likely end before the I/O operation scheduled to be execute during the CPU activity completes. As a result, the CPU will remain idle while it waits for the pending I/O operation to complete. Thus, using this information, scheduling of the I/O operations can be adjusted. In addition, the partitioning of extents can be dynamically changed, e.g., one or more of the groups can be partitioned into smaller groups.

System Architecture Overview

Figure 8:
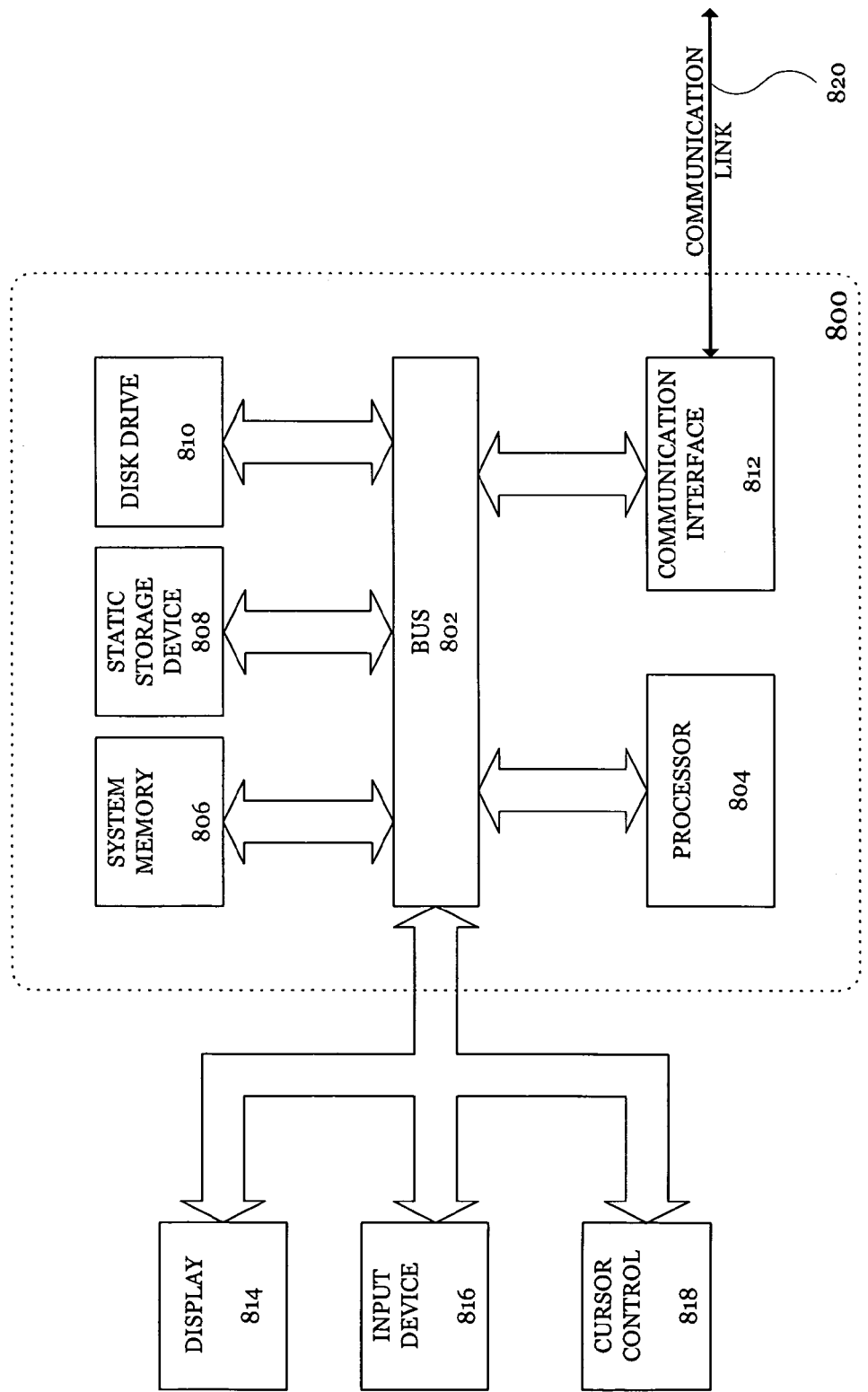
FIG. 8 illustrates a diagram of a computer system with which embodiments of the present invention can be implemented.

FIG. 8 is a block diagram of a computer system 800 suitable for implementing an embodiment of the present invention. Computer system 800 includes a bus 802 or other communication mechanism for communicating information, which interconnects subsystems and devices, such as processor 804, system memory 806 (e.g., RAM), static storage device 808 (e.g., ROM), disk drive 810 (e.g., magnetic or optical), communication interface 812 (e.g., modem or ethernet card), display 814 (e.g., CRT or LCD), input device 816 (e.g., keyboard), and cursor control 818 (e.g., mouse or trackball).

According to one embodiment of the invention, computer system 800 performs specific operations by processor 804 executing one or more sequences of one or more instructions contained in system memory 806. Such instructions may be read into system memory 806 from another computer readable medium, such as static storage device 808 or disk drive 810. In alternative embodiments, hard-wired circuitry may be used in place of or in combination with software instructions to implement the invention.

The term "computer readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as disk drive 810. Volatile media includes dynamic memory, such as system memory 806. Transmission media includes coaxial cables, copper wire, and fiber optics, including wires that comprise bus 802. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 800. According to other embodiments of the invention, two or more computer systems 800 coupled by communication link 820 (e.g., LAN, PTSN, or wireless network) may perform the sequence of instructions required to practice the invention in coordination with one another.

Computer system 800 may transmit and receive messages, data, and instructions, including program, i.e., application code, through communication link 820 and communication interface 812. Received program code may be executed by processor 804 as it is received, and/or stored in disk drive 810, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of accessing segments in data storage systems, the method comprising:
    coalescing a plurality of extents in a segment into a plurality of groups based on data storage device location; and
    submitting a single I/O operation for each group of extents.

2. The method of claim 1, wherein at least one of the I/O operations returns one or more extents that are not in the segment.

3. The method of claim 1, wherein the plurality of extents coalesced is only a portion of the extents in the segment.

4. The method of claim 3, wherein the number of extents in the portion of the segment coalesced is user-defined.

5. The method of claim 1, further comprising:
    partitioning at least one of the plurality of groups into two or more groups.

6. The method of claim 5, wherein partitioning of the at least one group is based on size.

7. The method of claim 6, wherein the size is dictated by system limits.

8. The method of claim 5, wherein partitioning of the at least one group is based on performance.

9. The method of claim 1, further comprising:
    scheduling the I/O operations to overlap with CPU activity.

10. The method of claim 9, wherein the I/O operations are scheduled to ensure that the CPU is not idle while an I/O operation is executing.

11. The method of claim 9, further comprising:
    collecting information on CPU activity and I/O operations; and
    adjusting the scheduling of the I/O operations based on the collected information.

12. The method of claim 1, wherein at least two of the plurality of extents in the segment differ in size.

13. A computer program product that includes a computer readable storage, the computer readable storage comprising instructions which, when executed by a processor, causes the processor to execute a process for accessing segments in data storage systems, the process comprising:
    coalescing a plurality of extents in a segment into a plurality of groups based on data storage device location; and
    submitting a single I/O operation for each group of extents.

14. The computer program product of claim 13, wherein at least one of the I/O operations returns one or more extents that are not in the segment.

15. The computer program product of claim 13, wherein the plurality of extents coalesced is only a portion of the extents in the segment.

16. The computer program product of claim 15, wherein the number of extents in the portion of the segment coalesced is user-defined.

17. The computer program product of claim 13, wherein the process further comprises:
partitioning at least one of the plurality of groups into two or more groups.

18. The computer program product of claim 17, wherein partitioning of the at least one group is based on size.

19. The computer program product of claim 18, wherein the size is dictated by system limits.

20. The computer program product of claim 17, wherein partitioning of the at least one group is based on performance.

21. The computer program product of claim 13, wherein the process further comprises:
scheduling the I/O operations to overlap with CPU activity.

22. The computer program product of claim 21, wherein the I/O operations are scheduled to ensure that the CPU is not idle while an I/O operation is executing.

23. The computer program product of claim 21, wherein the process further comprises:
collecting information on CPU activity and I/O operations; and
adjusting the scheduling of the I/O operations based on the collected information.

24. The computer program product of claim 13, wherein at least two of the plurality of extents in the segment differ in size.

25. A system for accessing segments in data storage systems, the system comprising:
means for coalescing a plurality of extents in a segment into a plurality of groups based on data storage device location; and
means for submitting a single I/O operation for each group of extents.

26. The system of claim 25, wherein at least one of the I/O operations returns one or more extents that are not in the segment.

27. The system of claim 25, wherein the plurality of extents coalesced is only a portion of the extents in the segment.

28. The system of claim 27, wherein the number of extents in the portion of the segment coalesced is user-defined.

29. The system of claim 25, further comprising:
means for partitioning at least one of the plurality of groups into two or more groups.

30. The system of claim 29, wherein partitioning of the at least one group is based on size.

31. The system of claim 30, wherein the size is dictated by system limits.

32. The system of claim 29, wherein partitioning of the at least one group is based on performance.

33. The system of claim 25, further comprising:
means for scheduling the I/O operations to overlap with CPU activity.

34. The system of claim 33, wherein the I/O operations are scheduled to ensure that the CPU is not idle while an I/O operation is executing.

35. The system of claim 33, further comprising:
means for collecting information on CPU activity and I/O operations; and
means for adjusting the scheduling of the I/O operations based on the collected information.

36. The system of claim 25, wherein at least two of the plurality of extents in the segment differ in size.

* * * * *